United States Patent Office 3,135,789
Patented June 2, 1964

---

3,135,789
CYCLIC BORON COMPOUNDS
Josef Fried, Princeton, Harry Louis Yale, New Brunswick, and Frank Herbert Bergeim, Highland Park, N.J., assignors to Olin Mathieson Chemical Corporation, New York, N.Y., a corporation of Virginia
No Drawing. Filed Nov. 29, 1961, Ser. No. 155,821
18 Claims. (Cl. 260—551)

This application is a continuation-in-part of our co-pending application Serial No. 140,256, filed September 25, 1961, and now abandoned.

This invention relates to cyclic boron compounds. More particularly, the invention relates to compounds represented by the structural Formula I (I)
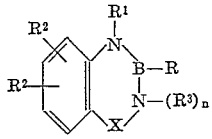

In the above formula, the symbol R represents hydroxy, alkyl, cycloalkyl, aryl and aralkyl groups. The aryl groups represented by R include the monocyclic phenyl group or bicyclic naphthyl group each of which may in addition bear one or more substituents (up to three) such as lower alkyl, e.g., methyl, ethyl, propyl, isopropyl, butyl and the like, a halogen, e.g., chlorine, bromine, iodine or fluorine, or a lower alkyl group such as methoxy, ethoxy and the like. The aralkyl groups represented by R include the phenyl group, substituted or unsubstituted as described above, attached to a straight or branched chain lower alkylene chain. The alkyl groups represented by R are preferably lower alkyl groups such as those illustrated above and the cycloalkyl groups incude cycloaliphatic groups, preferably of 3 to 6 carbon atoms such as cyclopropyl, cyclobutyl, cyclopentyl and cyclohexyl.

$R^1$ represents hydrogen as well as lower alkyl and aralkyl group of the character defined above. It also represents basic groups such as di-lower alkylamino-lower alkylene groups, e.g., dimethylaminomethyl, dimethylaminoethyl, diethylaminoethyl, and the like; the nitrogen of the basic group may also be part of a 5- to 6-membered heterocyclic to form substituents such as piperidinomethyl, piperidinopropyl, morpholinomethyl, pyrrolidinomethyl and the like.

$R^2$ is representative of hydrogen, halogen, sulfonamido, lower alkly, lower alkoxy and haloalkyl. The lower alkyl and lower alkoxy groups are of the character described previously in the discussion of the symbol R. The haloalkyl groups represented by $R^2$ include monohalogenated groups such as chloromethyl, bromoethyl and the like, as well as polyhalogenated groups such as trifluoromethyl. Any halogen may appear in this substituent.

$R^3$ has the same meaning as $R^1$ but the two symbols may represent the same or different substituents in an individual compound.

The symbol $n$ represents 0 when X represents a group containing a ring carbon. It represents 1 when X represents a group introducing a sulfur atom in the ring.

X, in Formula I, represents the amino grouping

wherein $R^4$ and $R^5$ each represents hydrogen, lower alkyl, aralkyl or $R^4$ and $R^5$ together with the nitrogen to which they are attached form a saturated 5- to 6-membered heterocyclic, or the sulfur dioxide grouping

The lower alkyl and aralkyl groups represented by $R^4$ and $R^5$ are of the same character as those described previously. The nitrogen heterocyclics include, for example, the piperidyl, morpholinyl, pyrrolidyl, N-methylpiperazinyl, and the like groups.

Compounds of this invention include, for example, 3,4-dihydro-3-phenyl-6-(trifluoromethyl)-2H-1,2,4,3 - benzothiadiazaborine-1,1-dioxide, 3,4-dihydro-3-(1-naphthyl)-6-(trifluoromethyl) - 2H - 1,2,4,3 - benzothiadiazaborine-1,1 - dioxide, 6-chloro-3,4-dihydro-3-(2-phenethyl)-2H-1, 2,4,3-benzothiadiazaborine-1,1-dioxide, 3,4 - dihydro-3-hydroxy-6-(trifluoromethyl)-2H-1,2,4,3 - benzothiadiazaborine-1,1-dioxide, 4 - amino-2,3-dihydro-2-phenyl-1H-1, 3,2-benzodiazaborine, 4-amino-2,3-dihydro-1-methyl-2-(1-naphthyl)-1H-1,3,2-benzodiazaborine, 4-amino-6-chloro-2,3-dihydro-2-(o-tolyl)-1H - 1,3,2 - benzodiazaborine, 4-amino-2,3-dihydro-6-methyl-2-(p-chlorophenyl) - 1H - 1,-3,2 - benzodiazaborine, 4 - amino - 2,3-dihydro-6-sulfonamido-2-(4-anisyl)-1H-1,3,2-benzodiazaborine, 4-amino-2,3-dihydro-7- sulfonamido-2-(2-naphthyl)-1H-1,3,2-benzodiazaborine, 4-amino-2,3-dihydro-1-(3-dimethylaminopropyl)-2-phenyl-1H-1,3,2-benzodiazaborine, 4 - amino-2,3-dihydro-1-[3 - (piperidino)propyl]-2-(2,3 - dimethylphenyl)-1H-1,3,2-benzodiazaborine, 4-amino-2,3-dihydro-2-(n-propyl)-6-sulfonamido-1H-1,3,2 - benzodiazaborine, 4-methylamino - 2,3-dihydro-2-phenyl-1H-1,3,2-benzodiazaborine, 4-benzylamino - 2,3 - dihydro-1-methyl-2-(1-naphthyl)-1H-1,3,2-benzodiazaborine, 4 - phenylamino-6-chloro-2,3-dihydro-2-(o-tolyl)-1H - 1,3,2 - benzodiazaborine, 4-diethylamino-2,3-dihydro-6-methyl-2-(p-chlorophenyl)-1H-1,3,2-benzodiazaborine, 4-dibenzylamino-2,3-dihydro-6-sulfonamido-2-(4-anisyl)-1H - 1,3,2 - benzodiazaborine, 4-(N-methyl-N-phenylamino)-2,3 - dihydro-2-(n-projyl)-6-sulfonamido-1H-1,3,2-benzodiazaborine, 4-(1-piperidyl) - 2,3-dihydro-2-(4-ethoxyphenyl)-1H-1,3,2-benzodiazaborine.

The compounds of this invention are useful as hypotensive agents and as central depressants in psychotherapy. They are also useful in the diagnosis of glioma and may be useful for the alleviation of symptoms or treatment thereof. They may be administered orally or parenterally in conventional vehicles according to customary practice.

The compounds of Formula I wherein X represents the amino grouping are produced by first forming a benzodiazaborinane of the formula (II)
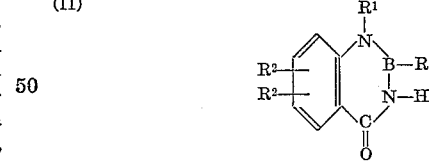

wherein the symbols have the meaning already defined, by reaction of an appropriately substituted benzamide, i.e., a compound of the formula (III)

wherein $R^1$ and $R^2$ have the meaning already defined, with a boronic acid of the formula (IV)          R—B—(OH)$_2$ wherein R has the meaning already defined.

The reaction between the benzamide and boronic acid is preferably effected in a non-aqueous medium, e.g., a hydrocarbon solvent such as xylene, toluene, petroleum ether, or the like, or another inert solvent such as diethyleneglycol dimethyl ether, dioxane, carbontetrachloride, etc., or mixtures thereof. A mixture of the reactants may be heated and the water formed in the reaction is removed azeotropically. Anhydrous reactants and solvents contribute to a more effective reaction.

The compound of Formula II is then reacted with phosphorus oxychloride to form the intermediate of the formula (V)
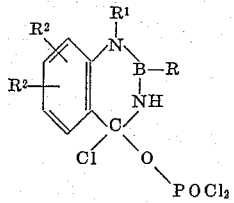

Intermediate V is heated with a lower alkanol, preferably ethanol, in an inert solvent such as chloroform, toluene, or the like. The alkanol need be used only in stoichiometric amount, so that the alcohol present as stabilizer in chloroform when the latter is used as solvent is usually sufficient. This reaction produces a compound of the formula (VI)
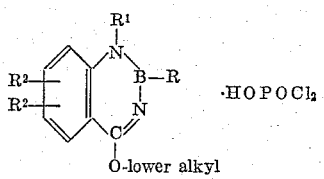

Compound VI may be converted to its free base of the formula (VII)
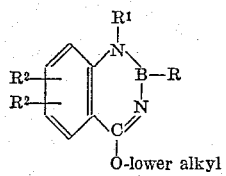

by treatment with an inorganic base such as alkali metal bicarbonate, e.g., aqueous sodium bicarbonate or with an organic base such as pyridine, N-methylmorpholine, etc., preferably as a suspension in an inert medium such as methylene dichloride, followed by concentration of the methylene dichloride.

Either the compound of Formula VI or its free base of Formula VII may be treated with liquid ammonia, a liquid amine, e.g., benzylamine, aniline, diethylamine, piperidine, morpholine, dibenzylamine, N-methylaniline or an aqueous solution of ammonia, preferably concentrated aqueous ammonia, methylamine, ethylamine, etc. at about room temperature or below to produce the compound of Formula I wherein X represents the amino grouping defined on page 2, supra.

Those compounds of Formula I wherein X represents the $SO_2$ grouping are produced by reacting an appropriately substituted benzenesulfonamide represented by the formula (VIII)
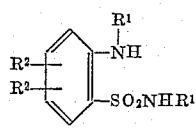

wherein $R^1$ and $R^2$ have the meaning already defined with a boronic acid of the Formula IV as described previously.

The following examples are illustrative of the invention. All temperatures are stated on the centigrade scale.

Example 1

A mixture of 7.2 g. of 2-amino-4-(trifluoromethyl)-benzenesulfonamide, 3.66 g. of benzeneboronic acid and 300 ml. of dry xylene is stirred and refluxed for 48 hours under a Dean-Stark trap. The hot suspension of solid is filtered and air dried. The product, 3,4-dihydro-3-phenyl-6-(trifluoromethyl)-2H-1,2,4,3-benzothiadiazaborine 1,1-dioxide, is resuspended in 50 ml. of preheated, boiling dry xylene, filtered and dried again, M.P. 301–303°.

Example 2

20 g. of 2,3-dihydro-2-phenyl-1,3,2-benzodiazaborine-4(1H)-one are added to freshly distilled $POCl_3$ (800 ml.). When the solid has dissolved, the solution is refluxed for 45 minutes and the excess $POCl_3$ is vacuum distilled. The volume of the solution is reduced to about 100 ml. and then stored for about 12 hours in the cold, filtered, dried in a vacuum desiccator to give 29 g. of 4-chloro-1,2,3,4-tetrahydro-2-phenyl-1,3,2-benzodiazaborin-4-ol, ester with dichlorophosphinic acid, M.P. 181–182° (dec.), $\lambda_{max}^{Tetrahydrofuran}$ 323 m$\mu$ ($\epsilon$=4,805), $\lambda_{max}^{Nujol}$ 3.24, 5.25, 6.15, 6.23, 6.33, 6.55, 6.68, 7.80, 9.03$\mu$ Analysis.—Calcd. for $C_{13}H_{11}BN_2O.POCl_3$ (375.41): B, 2.88; Cl, 28.40; N, 7.47; P, 8.26. Found: B, 2.61; Cl, 28.21; N, 7.53; P, 7.98.

This compound, 29 g., 9.0 liters of anhydrous chloroform stabilized with 100 g. of anhydrous ethanol are refluxed for one-half hour, the solution is filtered, concentrated to 200 ml., cooled and the solid collected to give 17.9 g. of 4-ethoxy-1,2-dihydro-2-phenyl-1,3,2-benzodiazaborine phosphorodichloridate, M.P. 138–140° (dec.), $\lambda_{max}^{Tetrahydrofuran}$ 359 m$\mu$ ($\epsilon$=4,200), $\lambda_{max}^{Nujol}$ 3.15, 6.12, 6.22, 6.30, 6.50, 6.72, 6.82, 6.95, 7.70, 9.02$\mu$ Analysis.—Calcd. for $C_{15}H_{16}BCl_2N_2O_3P$ (385.00): Cl, 18.42; N, 7.28; B, 2.81; P, 8.04; OEt, 11.70. Found: Cl, 1864; N, 7.33; B, 2.53; P, 7.48; OEt, 11.93, N.E. ($HClO_4$ in ACOH), 388.

This compound, 17.9 g., and 200 ml. of concentrated aqueous ammonia (d. 0.9) are shaken in a stoppered flask at room temperature for several days and the mixture filtered to give 8.1 g. of 4-amino-2,3-dihydro-2-phenyl-1H-1,3,2-benzodiazaborine, M.P. 260–263° (dec.).

Alternately, 100 mg. of 4-ethoxy-1,2-dihydro-2-phenyl-1,3,2-benzodiazaborine phosphorodichloridate are suspended in 20 ml. of liquid ammonia, the mixture is kept for five hours, the excess ammonia allowed to evaporate and the solid residue recrystallized from water to give a product identical with that obtained above by means of concentrated ammonium hydroxide.

Alternately, 2 g. of 4-ethoxy-1,2-dihydro-2-phenyl-1,3,2-benzodiazaborine phosphorodichloridate are suspended in 50 ml. of methylene chloride and the suspension shaken with a solution of 1.26 g. of sodium bicarbonate in 35 ml. of water. The methylene chloride solution is separated, dried and concentrated to give 1.3 g. of 4-ethoxy-1,2-dihydro-2-phenyl-1,3,2-benzodiazaborine, M.P. 120–121°, $\lambda_{max}^{Tetrahydrofuran}$ 390 m$\mu$ ($\epsilon$=4,650), $\lambda_{max}^{Nujol}$ 2.84, 2.98, 6.10, 6.19, 6.40, 6.70, 6.82, 6.89, 7.00$\mu$ Analysis.—Calcd. for $C_{15}H_{15}BN_2O.H_2O$ (268.14): C, 67.19; H, 6.38; OEt, 16.80. Found: C, 67.12; H, 6.43; OEt, 16.74, N.E. ($HClO_4$ in ACOH), 267.

When 1.3 g. of the base obtained above and 100 ml. of liquid ammonia are kept for five hours and the excess ammonia allowed to evaporate, there is obtained a product, M.P. 260–263°, identical with that obtained in the above procedure.

Example 3

By substituting 5.16 g. of 1-naphthaleneboronic acid for the benzeneboronic acid in Example 1, there is obtained 3,4 - dihydro-3-(1-naphthyl)-6-(trifluoromethyl)-2H-1,2,4,3-benzothiadiazaborine-1,1-dioxide.

Example 4

A mixture of 2.07 g. of 2-amino-4-chlorobenzenesulfonamide (prepared by the catalytic reduction of 4-chloro-2-nitrobenzenesulfonamide), 1.5 g. of 2-phenethylboronic acid and 200 ml. of Skellysolve E (a petroleum ether with a B.P. range of 100–120°) are reacted as in Example 1 to give 6-chloro-3,4-dihydro-3-(2-phenethyl)-2H-1,2,4,3-benzothiadiazaborine-1,1-dioxide.

Example 5

By substituting 29 g. of 1,2-dihydro-1-methyl-2-(1-naphthyl)-1,3,2-benzodiazaborine-4(3H)-one (prepared from o-methylaminobenzamide and 1-naphthaleneboronic acid in refluxing xylene and separating the water formed) for the 1,2-dihydro-2-phenyl-1,3,2-benzodiazaborine-4(3H)-one in Example 2, there is obtained 4-amino - 2,3 - dihydro-1-methyl-2-(1-naphthyl)-1H-1,3,2-benzodiazaborine.

Example 6

A solution of 2.07 g. of 2-amino-5-chlorobenzenesulfonamide, 1.41 g. of o-tolueneboronic acid in 200 ml. of dry toluene is refluxed under a Dean-Stark trap to remove the water formed by the reaction. When the theoretical amount of water separates, the reaction mixture is cooled to give 3,4-dihydro-3-(o-tolyl)-7-chloro-2H-1,2,4,3-benzothiadiazaborine-1,1-dioxide.

Example 7

(a) To a solution of 19.8 g. of 6-chloroisatoic anhydride (prepared from 5-chloroanthranilic acid and phosgene in aqueous potassium carbonate solution) in 200 ml. of 95% ethanol is added 10 ml. of concentrated aqueous ammonia. The solution which forms is concentrated to give 5-chloroanthranilamide.

(b) A mixture of 17.2 g. of 5-chloroanthranilamide, 14.2 g. of o-tolueneboronic acid and 800 ml. of dry toluene are refluxed to remove the water formed in the reaction, then cooled to give 6-chloro-2,3-dihydro-2-(o-tolyl)-1,3,2-benzodiazaborin-4(1H)-one.

(c) By substituting 20 g. of the product from (b) above for the 2,3-dihydro-2-phenyl-1,3,2-benzodiazaborine-4-(1H)-one in Example 2 there is obtained 4-amino - 6 - chloro-2,3-dihydro-2-(o-tolyl)-1H-1,3,2-benzodiazaborine.

Example 8

(a) By substituting 17.8 g. of 6-methylisatoic anhydride (prepared from 3-amino-p-toluic acid and phosgene in aqueous potassium carbonate solution) for the 6-chloroisatoic anhydride in Example 7(a), there is obtained 3-amino-p-toluamide.

(b) By substituting 15.2 g. of 3-amino-p-toluamide for the 5-chloroanthranilamide and 16.7 g. p-chlorobenzeneboronic acid for the o-tolueneboronic acid in Example 7(b), there is obtained 2,3-dihydro-6-methyl-2-(p-chlorophenyl)-1,3,2-benzodiazaborin-4(1H)-one.

(c) By substituting 20 g. of the product from (b) above for the 1,2-dihydro-2-phenyl - 1,3,2 - benzodiazaborin-4(3H)-one in Example 2, there is obtained 4-amino-2,3-dihydro-6-methyl-2-(p-chlorophenyl)-1H-1,3,2 - benzodiazaborine.

Example 9

(a) A mixture of 21.5 g. of 5-sulfonamidoanthranilamide (prepared from 5-sulfoanthranilic acid by treatment first with thionyl chloride in the presence of 1–5% by volume of N,N-dimethylformamide to give the 5-chlorosulfonylanthraniloyl chloride hydrochloride, followed by treatment with ammonia), 15.2 g. of 4-anisoleboronic acid and 800 ml. of dry xylene are reacted as in Example 7(b) to give 2-(4-anisyl)-2,3-dihydro-6-sulfonamido-1,3,2-benzodiazaborin-4-(1H)-one.

(b) By substituting 20 g. of the product from (a) above for the 2,3-dihydro-2-phenyl-1,3,2-benzodiazaborin-4(1H)-one in Example 2, there is obtained 4-amino-2-(4 - anisyl)-2,3 - dihydro-6-sulfonamido-1H-1,3,2-benzodiazaborine.

Example 10

(a) By substituting 21.5 g. of 4-sulfonamidoanthranilamide [prepared from 4-sulfoanthranilic acid] for the 5-sulfonamidoanthranilamide and 17.2 g. of 2-naphthaleneboronic acid for the 4-anisoleboronic acid as described in Example 9(a), there is obtained 2,3-dihydro-2-(2-naphthyl)-7-sulfonamido-1,3,2-benzodiazaborin - 4-(1H)-one.

(b) The product from (a) above, 20 g., substituted for the 2,3 - dihydro-2-phenyl-1,3,2 - benzodiazaborin-4(1H)-one in Example 2, gives 4-amino-2,3-dihydro-2-(2-naphthyl)-7-sulfonamido-1H-1,3,2-benzodiazaborine.

Example 11

(a) To a solution of 19.3 g. of anhydrous sodium carbonate in 150 ml. of water is added portionwise 50 g. of anthranilic acid, followed by 50 g. of 3-dimethylaminopropyl chloride, also added slowly. The mixture is stirred and refluxed for two hours to give 63 g. of N-(3-dimethylaminopropyl)anthranilic acid.

(b) To 15 g. of anhydrous potassium carbonate in 300 ml. of water is added slowly 62.5 g. of the product from (a) above, followed by the slow addition of 37.0 g. of ethyl chloroformate. The precipitated solid is filtered to give 70.3 g. of N-carboxy-N-(3-dimethylaminopropyl) anthranilic acid, N-ethyl ester.

(c) The product from (b) is placed in a preheated oil bath at 220° and heated one-half hour at 220° to give 35.6 g. of 1-(3-dimethylaminopropyl)isatoic anhydride.

(d) The product from (c), 35.0 g., is suspended in 450 ml. of 95% ethanol and 70 ml. of 2 N ethanolic ammonia added. Subsequently the alcohol solution is concentrated to give 19.8 g. of o-(3-dimethylaminopropyl) aminobenzamide.

(e) The reaction between 2.19 g. of the product from (d) above and 1.2 g. of benzeneboronic acid is carried out in 100 ml. of dry toluene as described in Example 7(b) to give 2.6 g. of 2,3-dihydro-1-(3-dimethylaminopropyl)-2-phenyl-1,3,2-benzobiazaborin-4-(1H)-one.

(f) The product from (e) above, 2.5 g., and 100 ml. of freshly distilled POCl₃ are refluxed for one hour and the POCl₃ removed in vacuo. The residual solid is dissolved in about 25 ml. of chloroform and 1.0 g. absolute ethanol, the solution refluxed for fifteen minutes, cooled and added to 100 ml. of cold concentrated aqueous ammonia. The reaction mixture is heated for fifteen minutes on the steam bath and cooled to give 4-amino-2,3-dihydro-1 - (3 - dimethylaminopropyl)-2-phenyl-1H-1,3,2-benzodiazaborine.

Example 12

A mixture of 7.2 g. of 2-amino-4-(trifluoromethyl)benzenesulfonamide, 6.24 g. of trimethyl borate and 250 ml. of dry toluene are slowly distilled so that 150 ml. of distillate are collected in eight hours. The remaining volatile material is removed in vacuo from the steam bath and the residual solid stirred thoroughly with ether which has been saturated with water. The solid is filtered to give 3,4 - dihydro - 3-hydroxy-6-(trifluoromethyl)-2H-1,2,4,3-benzothiadiazaborine-1,1-dioxide.

Example 13

(a) By substituting 16.4 g. of mestiyleneboronic acid for the 4-anisoleboronic acid in Example 9(a) there is obtained 2,3 - dihydro-2-mesityl-6-sulfonamido-1,3,2-benzodiazaborine-4(1H)-one.

(b) By substituting 20 g. of the product from (a) above for the 2,3-dihydro-2-phenyl-1,3,2-benzodiazaborine-4(1H)-one in Example 2 there is obtained 4-amino-2,3 - dihydro - 2-mesityl-6-sulfonamido-1H-1,3,2-benzodiazaborine.

Example 14

(a) By substituting 8.8 g. of n-propaneboronic acid for the 4-anisoleboronic acid in Example 9(a) there is obtained 2,3 - dihydro-2-(n-propyl)-6-sulfonamido-1,3,2-benzodiazaborine-4(1H)-one.

(b) By substituting 10 g. of the product from (a) above for the 2,3-dihydro-2-phenyl-1,3,2-benzodiaborine-4(1H)-one in Example 2, there is obtained 4-amino-2,3-dihyro - 2-(n-propyl)-6-sulfonamido-1H-1,3,2-benzodiazaborine.

Example 15

A mixture of 50 ml. of dry diethyleneglycol dimethyl ether and 75 ml. of dry xylene is distilled into a 20 ml. capacity Dean-Stark trap to azeotropically remove moisture. The mixture of xylene and diethyleneglycol dimethyl ether is cooled somewhat and 2.8 g. of carefully dried benzeneboronic acid and 6.4 g. of carefully dried 5-amino-α,α,α-trifluoro-2,4-toluene disulfonamide are added. The mixture is stirred and heated unde the Dean-Stark trap for a period of about twenty-four hours to remove the water formed. The reaction mixture is cooled and the solid product, 3-phenyl-6-(trifluoromethyl)-1,2,4,3-benzothiadiazaborine-7-sulfonamide 1,1-dioxide, is separated by filtration, M.P. 305–307° (dec.).

Example 16

By substituting phenethylboronic acid for the benzeneboronic acid in Example 15, 3-phenylethyl-6-(trifluoromethyl)-1,2,4,3-benzothiadiazaborine-7-sulfonamide 1,1-dioxide, M.P. 210–212°, is obtained.

Example 17

When 1.5 g. of 4-ethoxy-1,2-dihydro-2-phenyl-1,3,2-benzodiazaborine phosphorodichloridate, obtained in Example 2 are suspended in 60 ml. of 40% aqueous methylamine and the mixture shaken for four days in a sealed flask, there is obtained 4-methylamino-2,3-dihydro-2-phenyl-1H-1,3,2-benzodiazaborine.

Example 18

When 3.0 g. of 4-ethoxy-1,2-dihydro-2-phenyl-1,3,2-benzodiazaborine phosphorodichloridate, obtained as in Example 2 are suspended in 40 ml. of benzylamine and 10 ml. of 95% ethanol and the mixture shaken for four days there is obtained 4-benzylamino-2,3-dihydro-2-phenyl-1H-1,3,2-benzodiazaborine.

Example 19

When 40 ml. of aniline are used in place of the benzylamine in Example 18, there is obtained 4-phenylamino-2,3-dihydro-2-phenyl-1H-1,3,2-benzodiazaborine.

Example 20

By substituting 20 ml. of diethylamine for the benzylamine in Example 18, there is obtained 4-diethylamino-2,3-dihydro-2-phenyl-1H-1,3,2-benzodiazaborine.

Example 21

By substituting 40 ml. of N-methylaniline for the benzylamine in Example 18, there is obtained 4-(N-methyl-N-phenylamino) - 2,3-dihydro-2-phenyl-1H-1,3,2-benzodiazaborine.

Example 22

By substituting 40 ml. of piperidine for the benzylamine in Example 18, there is obtained 4-piperidyl-2,3-dihydro-2-phenyl-1H-1,3,2-benzodiazaborine.

This invention may be variously otherwise embodied within the scope of the appended claims.

What is claimed is:

1. A compound of the formula

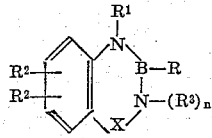

wherein R is a member selected from the group consisting of hydroxy, lower alkyl, cycloalkyl of 3 to 6 carbon atoms, phenyl, naphthyl and phenyl-lower alkyl, each of the last three bearing on the aryl 0 to 3 members selected from the group consisting of lower alkyl, lower alkoxy, and halogen; $R^1$ and $R^3$ each is a member selected from group consisting of hydrogen, lower alkyl, phenyl-lower alkyl bearing on the phenyl ring 0 to 3 members selected from the group consisting of lower alkyl, lower alkoxy and halogen, di-lower alkylamino-lower alkyl, N-piperidino-lower alkyl, N-morpholino-lower alkyl and N-pyrrolidino-lower alkyl; $R^2$ is a member selected from the group consisting of hydrogen, halogen, sulfonamido, lower alkyl, lower alkoxy, and halo-lower alkyl; X is a member selected from the group consisting of

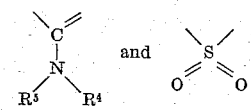

$R^4$ and $R^5$ each is a member selected from the group consisting of hydrogen, lower alkyl, phenyl-lower alkyl bearing on the phenyl ring 0 to 3 members selected from the group consisting of lower alkyl, lower alkoxy and halogen, and $R^4$ and $R^5$ together with the nitrogen to which they are attached is a member selected from the group consisting of N-piperidyl, N-morpholinyl, N-pyrrolidyl and N-methylpiperazinyl; n is 0 when X is the amino group and n is 1 when X is the sulfur dioxide group.

2. A compound of the formula

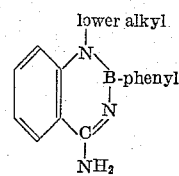

3. A compound of the formula

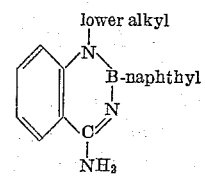

4. A compound of the formula

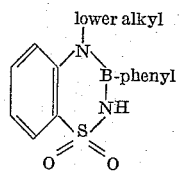

5. A compound of the formula

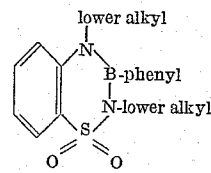

6. A compound of the formula

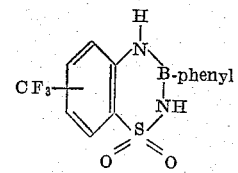

7. A compound of the formula

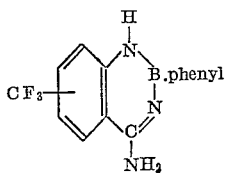

8. 3,4 - dihydro - 3 - phenyl-6-(trifluoromethyl)-2H-1,2,4,3-benzothiadiazaborine 1,1-dioxide.
9. 4-amino - 2,3-dihydro-2-phenyl-1H-1,3,2-benzodiazaborine.
10. 3,4-dihydro - 3 - (1-naphthyl)-6-(trifluoromethyl)-2H-1,2,4,3-benzothiadiazaborine 1,1-dioxide.
11. 3 - phenyl - 6-(trifluoromethyl)-1,2,4,3-benzothiadiazaborinane-7-sulfonamide 1,1-dioxide.
12. A process for the production of compounds of the formula

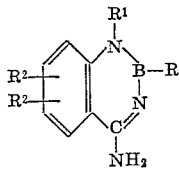

wherein R is a member selected from the group consisting of hydroxy, lower alkyl, cycloalkyl of 3 to 6 carbon atoms, phenyl, naphthyl and phenyl-lower alkyl, each of the last three bearing on the aryl 0 to 3 members selected from the group consisting of lower alkyl, lower alkoxy and halogen; $R^1$ is a member selected from the group consisting of hydrogen, lower alkyl, phenyl-lower alkyl bearing on the phenyl ring 0 to 3 members selected from the group consisting of lower alkyl, lower alkoxy, and halogen, di-lower alkylamino-lower alkyl, N-piperidino-lower alkyl, N-morpholino-lower alkyl, and N-pyrrolidino-lower alkyl; and $R^2$ is a member selected from the group consisting of hydrogen, halogen, sulfonamido, lower alkyl, lower alkoxy and halo-lower alkyl,
which comprises reacting a compound of the formula

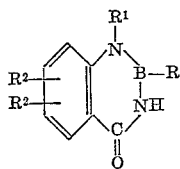

wherein R, $R^1$ and $R^2$ have the meaning defined above, with phosphorus oxychloride, heating with a lower alkanol and then reacting with a member of the group consisting of liquid ammonia and aqueous ammonia.
13. A process for the production of compounds of the formula

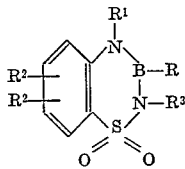

wherein R is a member selected from the group consisting of hydroxyl, lower alkyl, cycloalkyl of 3 to 6 carbon atoms, phenyl, naphthyl and phenyl-lower alkyl, each of the last three bearing on the aryl 0 to 3 members selected from the group consisting of lower alkyl, lower alkoxy and halogen; $R^1$ and $R^3$ each is a member seelected from the group consisting of hydrogen, lower alkyl, phenyl-lower alkyl bearing on the phenyl ring 0 to 3 members selected from the group consisting of lower alkyl, lower alkoxy, and halogen, di-lower alkylamino-lower alkyl, N-piperidino-lower alkyl, N-morpholino-lower alkyl, and N-pyrrolidino-lower alkyl; and $R^2$ is a member selected from the group consisting of hydrogen, halogen, sulfonamido, lower alkyl, lower alkoxy and halo-lower alkyl,
which comprises reacting a compound of the formula

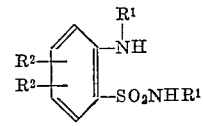

wherein $R^1$ and $R^2$ have the same meaning as defined above,
with a boronic acid of the formula

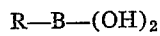

wherein R has the meaning defined above,
in a non-aqueous medium.
14. A process for the production of 4-lower alkoxy-1,2-dihydro-2-phenyl-1,3,2 - benzodiazaborine phosphorodichloridate which comprises reacting 2,3-dihydro-2-phenyl-1,3,2-benzodiazaborine-4(1H)-one with phosphorus oxychloride and heating the reaction product with a lower alkanol.
15. A compound of the formula

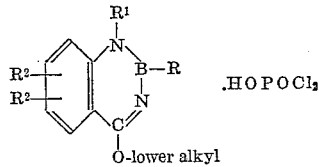

wherein R is a member selected from the group consisting of hydroxy, lower alkyl, cycloalkyl of 3 to 6 carbon atoms, phenyl, naphthyl and phenyl-lower alkyl, each of the last three bearing on the aryl 0 to 3 members selected from the group consisting of lower alkyl, lower alkoxy and halogen; $R^1$ is a member selected from the group consisting of hydrogen, lower alkyl, phenyl-lower alkyl bearing on the phenyl ring 0 to 3 members selected from the group consisting of lower alkyl, lower alkoxy, and halogen, di-lower alkylamino-lower alkyl, N-piperidino-lower alkyl, N-morpholino-lower alkyl, and N-pyrrolidino-lower alkyl; and $R^2$ is a member selected from the group consisting of hydrogen, halogen, sulfonamido, lower alkyl, lower alkoxy and halo-lower alkyl.
16. 4-ethoxy - 1,2 - dihydro-2-phenyl-1,3,2-benzodiazaborine phosphorodichloridate.
17. A compound of the formula

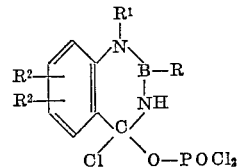

wherein R is a member selected from the group consisting of hydroxy, lower alkyl, cycloalkyl of 3 to 6 carbon atoms, phenyl, naphthyl and phenyl-lower alkyl, each of the last three bearing on the aryl 0 to 3 members selected from the group consisting of lower alkyl, lower alkoxy and halogen; $R^1$ is a member selected from the group consisting of hydrogen, lower alkyl, phenyl-lower alkyl bearing on the phenyl ring 0 to 3 members selected from the group consisting of lower alkyl, lower alkoxy, and halogen, di-lower alkylamino-lower alkyl, N-piperidino-lower alkyl, N-morpholino-lower alkyl, and N-pyrrolidino-lower alkyl; and $R^2$ is a member selected from the group consisting of hydrogen, halogen, sulfonamido, lower alkyl, lower alkoxy and halo-lower alkyl.

18. A compound of the formula

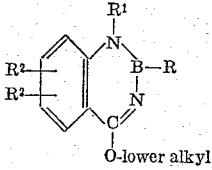

wherein R is a member selected from the group consisting of hydroxy, lower alkyl, cycloalkyl of 3 to 6 carbon atoms, phenyl, naphthyl and phenyl-lower alkyl, each of the last three bearing on the aryl 0 to 3 members selected from the group consisting of lower alkyl, lower alkoxy and halogen; $R^1$ is a member selected from the group consisting of hydrogen, lower alkyl, phenyl-lower alkyl bearing on the phenyl ring 0 to 3 members selected from the group consisting of lower alkyl, lower alkoxy, and halogen, di-lower alkylamino-lower alkyl, N-piperidino-lower alkyl, N-morpholino-lower alkyl, and N-pyrrolidino-lower alkyl; and $R^2$ is a member selected from the group consisting of hydrogen, halogen, sulfonamido, lower alkyl, lower alkoxy and halo-lower alkyl.

No references cited.